United States Patent [19]

Tassitino, Jr. et al.

[11] Patent Number: 5,745,356
[45] Date of Patent: Apr. 28, 1998

[54] INDEPENDENT LOAD SHARING OF AC POWER SYSTEMS CONNECTED IN PARALLEL

[75] Inventors: Frederick Tassitino, Jr., Wake Forest; John G. Tracy, Raleigh, both of N.C.

[73] Assignee: Exide Electronics Corporation, Raleigh, N.C.

[21] Appl. No.: 673,602

[22] Filed: Jun. 25, 1996

[51] Int. Cl.$^6$ .................. H02M 7/00; H02M 7/5387; H02J 3/00
[52] U.S. Cl. .................. 363/71; 307/65; 307/32
[58] Field of Search .................. 363/71, 65, 37; 307/52, 82, 80, 81, 31, 32, 33, 85, 86, 87, 64–66

[56] References Cited

U.S. PATENT DOCUMENTS

| | | | |
|---|---|---|---|
| 3,621,365 | 11/1971 | Beck | 307/58 |
| 4,038,559 | 7/1977 | Chun et al. | 307/64 |
| 4,114,048 | 9/1978 | Hull et al. | 307/53 |
| 4,733,341 | 3/1988 | Miyazawa | 363/71 |
| 4,924,170 | 5/1990 | Henze | 323/272 |
| 5,157,260 | 10/1992 | Jordan et al. | 307/59 |
| 5,191,519 | 3/1993 | Kawakami | 363/71 |
| 5,229,928 | 7/1993 | Karlsson et al. | 363/71 |
| 5,262,935 | 11/1993 | Shirahama et al. | 363/71 |
| 5,436,512 | 7/1995 | Inam et al. | 363/71 |
| 5,473,528 | 12/1995 | Hirata et al. | 363/71 |
| 5,596,492 | 1/1997 | Divan et al. | 363/95 |

*Primary Examiner*—Stuart N. Hecker
*Assistant Examiner*—Bao Q. Vu

*Attorney, Agent, or Firm*—Woodcock Washburn Kurtz Mackiewicz & Norris LLP

[57] ABSTRACT

A parallel redundant power supply system which does not use any inter-unit signaling is obtained by using the AC output power level of a power system to coordinate load sharing. The necessary information for load sharing is derived solely from each power system's output power level in such a manner that the output of a power system is inherently phase locked to the output of other power systems to which it is connected in parallel. Each parallel connected power system designed in accordance with the invention includes means for generating an AC output voltage from a DC input power source, means for sampling either a DC input voltage from the DC input power source or the AC output voltage from the AC output voltage generating means to provide power level samples, and means for determining the AC output power of the AC output voltage generating means from the power level samples. A control signal is then generated and provided to the AC output voltage generating means to control the AC output phase and output frequency of the AC output voltage from the AC output voltage generating means based on the output power level of the AC output voltage generating means and a derivative of the output power level of the AC output voltage generating means so as to affect load sharing in a manner proportional to a unit power rating of the power system with other power systems to which the power system is connected in parallel without requiring inter-unit signaling between the power systems. Generally, the control signal is determined by integrating the derivative of the output power level of the AC output voltage generating means as determined from the power level samples.

25 Claims, 5 Drawing Sheets

INDEPENDENT LOAD SHARING OF AC POWER SYSTEMS CONNECTED IN PARALLEL

BACKGROUND OF THE INVENTION

1. Field of the Invention

The present invention generally relates to a method and apparatus for using the AC output power level of a power system so that communication amongst parallel redundant power systems is not necessary for coordinating load sharing. More particularly, the present invention relates to a technique by which the necessary information for load sharing is derived solely from each power system's output power level in such a manner that the output of a power system is inherently phase locked to the output of other power systems to which it is connected in parallel.

2. Description of the Prior Art

Connecting two or more power systems in a parallel redundant fashion is a necessary requirement for those who need ever higher and higher power availability. For this reason, the outputs of both static and rotary Alternating Current (AC) power systems are commonly connected together in parallel as shown in FIG. 1. The purpose of this configuration typically is to increase the capacity of the total power system and also to provide redundancy in case of failure of one of the parallel power systems. These systems typically operate at 50 or 60 Hertz to provide electrical power to a load. An example would be multiple static Uninterruptible Power System (UPS) with their outputs connected together as shown in FIG. 1.

As illustrated in FIG. 1, prior art parallel redundant power supply systems use inter-unit signaling to facilitate load sharing. As in the example of FIG. 1, a plurality of uninterruptible power systems (UPSs) 1 responsive to a three phase AC input voltage may be connected in a parallel redundant capacity configuration to provide a constant AC output voltage to a load 2. Each UPS 1 is connected to a DC voltage source (battery) 3 in a conventional manner to provide constant power in the event of an AC power failure. As illustrated, load sharing circuits 4 are associated with each UPS 1 to facilitate inter-unit signaling for load sharing and selective tripping using either a "difference from average" real time current signal on a "difference from average" bus, or a 10 synchronizing signal provided on a synchronizing signal bus. Such busses may be common wiring or fiber optic cabling. Generally, if a fault is detected, the appropriate switch or relay 5 is thrown to remove the faulty UPS 1 from the power circuit, thereby maintaining a constant AC output voltage on the load 2.

A requirement for such AC power systems connected in parallel is that each system share the output load 2 so that each unit has an equal portion of the output load 2.

This technique is known as load sharing. The amplitude difference and phase difference of the alternating current (AC) output voltages among the power systems 1 along with their output impedances determines how the power systems 1 will share the system load 2. Due to the output impedance of the power systems 1, the amplitude difference predominately causes a reactive power difference and the phase difference predominately causes a real power difference. An amplitude difference has been shown to be tolerable and manageable without a load sharing technique. Phase difference, on the other hand, is not tolerable. The AC power systems 1 must be phase locked in order to operate with their outputs connected together in parallel. The frequency of the AC output voltage of a power system is controlled to either free run at a fixed frequency or is phase locked to a reference source such as an alternate power source. Thus, load share phase control is typically integrated into the power system's frequency or phased lock loop controller.

Two conventional techniques that are used to provide load sharing amongst parallel AC power systems are known as common sync load sharing and difference from average load sharing. Both schemes require interconnections amongst the parallel power systems and load sharing circuitry 4 (FIG. 1) for signal processing and interfacing. As in the example of FIG. 1, paralleled power systems can employ either or both schemes.

The common sync load sharing technique uses a common synchronization signal to phase lock the outputs of the power systems 1. The common synchronization signal on the sync bus can be derived from a contribution of all power systems 1, can be derived from a master controller, or from a common phase locked alternate power source.

As shown in FIG. 1, the signal(s) are wired to each power system 1, and each power system monitors the synchronization signal and phase locks to the sync signal shared amongst the power systems over the sync bus. The sync signal must be present and functioning at each power system 1 or an alternate or redundant means must be provided as well.

In the difference from average load sharing technique, on the other hand, the phase differences between the power system output currents and the load share bus are vectorially added to a low level signal representing the power system's output voltage. This low level biased voltage is used to phase lock the output voltages of the power systems 1 to the average system value. Typically, AC current transformers are used to sense a power system's output current, and the sensed current signal is connected to the "difference from average" load share bus (FIG. 1) through a resistor. As shown in FIG. 1, the difference from average load share bus is connected to each parallel power system, and the voltage drop across the resistor is the difference from average signal that is vectorially added to a signal representing the output voltage and used for phase control. The resulting biased signal provides information that is used to phase lock the power systems 1.

Using "difference from average" load sharing or common synchronization signal load sharing is common practice. However, as just noted, inter-unit signaling amongst the parallel redundant power systems is required for each of these techniques to function effectively. Unfortunately, the use of such inter-unit signaling is vulnerable to interruption and must be redundant itself to prevent the creation of a single failure point for the otherwise totally redundant parallel power systems. A load sharing technique is desired that does not have such a single failure point.

The additional signaling and the additional internal circuits required by the prior art parallel redundant power systems for load sharing purposes also have had an adverse impact on reliability. Indeed, the physical connection amongst the power systems and the additional circuitry in each power system has many shortcomings. For example, if a wire shorts or opens which is connecting load share and/or common synchronization circuitry within each power system together, the load sharing ability of the power system is lost. To overcome this shortcoming, some power systems require redundant wiring. Additional circuitry is also added to detect open or shorted wiring. Also, the wiring requirements make the redundant parallel power systems of the prior art much more difficult to install. Special wiring requirements such as wire gauge, twisted pair, twisted triplets and in some cases fiber optic cable are denoted. Specially trained service engineers are typically needed to verify the interconnections through special testing before commissioning the unit. If all the drawing details are not met, undetected problems could occur.

In addition, the interconnection wiring amongst the power systems of the prior art connects directly to circuitry inside of each unit. This circuitry both drives and uses the signals on the interconnecting wires. A failed circuit could corrupt a signal on the interconnecting wire, and the failure may not be removable from the load sharing signal.

The failed unit must either remove the fault from the load share signal or a redundant load share circuit and interconnecting wire must be connected between the "good" power systems.

Typically, low voltage analog and digital load sharing signals are connected between the paralleled power systems. Circuitry must be added to transmit and receive these signals. In addition, circuitry must be added to isolate the load share circuit reference (GND) from the power system logic reference. Even with isolation, the distance from each power system can affect load sharing due to the effects of noise. High gauge wiring is sometimes used to overcome both reference and distance problems. Such circuitry as well as the interface circuitry, such as current transformers, wiring and printed circuit boards, is often quite expensive. Prior art power systems of the type illustrated in FIG. 1 also may require circuit gain checks using a voltage rise test, which requires that at least one power system be on line. This test can affect the output voltage amplitude and frequency of the power system on line.

Accordingly, a load sharing technique is also desired which is allows the power systems to operate independently so that they are not reliant upon externally derived information such as the "difference from average" signal to provide effective load sharing and the attendant circuitry and connections which can lead to the problems noted above. It is thus an object of the present invention to provide more reliable techniques for load sharing which preferably do not require inter-unit signaling for the power systems to operate in a completely parallel redundant manner.

SUMMARY OF THE INVENTION

The present invention solves the afore-mentioned problems in the prior art by providing a parallel redundant power supply system which does not use any inter-unit signaling. Instead, each power system accomplishes load sharing by using its own output power level. In other words, a power system in accordance with the invention can independently load share with other power systems without any type of control or communications connection from the other units. As a result, no signaling or wiring from the other power systems is required for load sharing.

The present invention combines the fundamental relationships of phase to frequency, of phase difference to power difference, and of frequency difference to change in power level into a technique that allows an AC power system to inherently phase lock to other power systems connected in parallel with its output AC voltage. In accordance with the invention, an AC power system's output power level alone is all that is necessary for providing effective load sharing. In particular, the derivative of the output power level, $\Delta P$, and the actual power level, P, are used to control a power system's output frequency and phase to inherently phase lock its output voltage to the outputs of other paralleled power systems. In a static AC power system that converts DC to AC, the choice of using DC versus AC power measurements is arbitrary. This technique can be used to load share with either an uncontrolled power system or other power systems controlled using this same technique.

The present invention relates to a parallel redundant power system in which a plurality of parallel-connected power systems provide AC power to a load via a common power connection. Each parallel power system performs self-monitoring of its power output and adjusts as necessary for load sharing with other parallel connected units. Furthermore, each of the parallel-connected power systems is capable of operating as a single stand-alone unit while performing the same self monitoring and adjustments needed for parallel operation. In a preferred embodiment of the invention, at least one of the power systems comprises means for generating an AC output voltage from a DC input power source, means for sampling one of a DC input voltage from the DC input power source and the AC output voltage from the AC output voltage generating means to provide power level samples, and means for determining the AC output power of the AC output voltage generating means from the power level samples. A control signal is then generated and provided to the AC output voltage generating means to control the AC output phase and output frequency of the AC output voltage from the AC output voltage generating means based on the output power level of the AC output voltage generating means and a derivative of the output power level of the AC output voltage generating means so as to affect load sharing in a manner proportional to a unit power rating of the power system with other power systems to which the power system is connected in parallel without requiring inter-unit signaling between the power systems.

In accordance with the invention, the AC output voltage generating means may generate a three phase output power, a single phase, or a split phase output power. Also, the sampling means may comprises means for sampling DC current and DC voltage of the DC input power source and means for multiplying the DC voltage and the DC current samples to obtain the power level samples. On the other hand, the sampling means may comprise means for sampling AC current and AC voltage of the AC output voltage generating means and means for multiplying the AC voltage and the AC current samples to obtain the power level samples.

Preferably, the control signal drives the AC output voltage generating means to load share in a proportion defined by the unit power rating of the AC output voltage generating means divided by a total combined rating of the power systems. Also, the AC output voltage generating means may be driven to provide a fixed amount of output power.

In accordance with the invention, the a microcontroller calculates a change in DC input power level to the AC output voltage generating means from the power level samples and integrates the change in DC input power level over an input frequency range of the AC output voltage generating means to determine an input frequency to the AC output voltage generating means. The microcontroller also calculates the change in frequency of the AC output voltage from the input frequency and the DC input power level and integrates the derivative of the output power level of the AC output voltage to generate the control signal. The providing means may also include means for continuously integrating the output frequency toward a fixed target frequency or for continuously adjusting the output frequency to phase lock with an alternate power source. In any case, the control signal drives the AC output voltage generating means to stabilize the output frequency and the AC output phase of the AC output voltage.

Thus, in the preferred embodiment, the input power to the AC output voltage generating means is calculated by the AC output power determining means from the DC current and voltage samples by multiplying the voltage times the current. A portion of both the derivative of the output power level and the output power level itself are used to control the frequency of the AC output power determining means in a manner that causes the AC output power to synchronize and load share with any number of parallel-connected power systems. The frequency of the AC output voltage is additionally controlled to cause the entire power system to either operate at a fixed frequency or to synchronize to an alternate power source.

The scope of the invention also includes a method of providing independent load sharing among at least two power systems connected in parallel so as to provide AC power from an AC power generating means of each power system to a load via a common power connection while simultaneously operating at a fixed frequency or synchronizing to an alternate power source. A preferred embodiment of such a method in accordance with the invention comprises the steps of:

generating an AC output voltage from a DC input power source;

sampling one of a DC input voltage from the DC input power source and the AC output voltage from the AC power generating means to provide power level samples;

determining the AC output power of the AC power generating means from the power level samples; and providing a control signal to the AC power generating means to control the AC output phase and output frequency of the AC output voltage from the AC power generating means based on the output power level of the AC power generating means and a derivative of the output power level of the AC power generating means so as to affect load sharing in a manner proportional to a unit power rating of the power system with other power systems to which the power system is connected in parallel without requiring inter-unit signaling between the power systems.

In a preferred embodiment of the method of the invention, the sampling step comprises the steps of sampling DC current and DC voltage of the DC input power source and multiplying the DC voltage and the DC current samples to obtain the power level samples. Alternatively, the sampling step may comprise the steps of sampling AC current and AC voltage of the AC power generating means and multiplying the AC voltage and the AC current samples to obtain the power level samples.

The method of the invention may also include the steps of driving the AC power generating means to load share in a proportion defined by the unit power rating of the AC power generating means divided by a total combined rating of the power systems or of driving the AC power generating means to provide a fixed amount of output power.

A change in DC input power level to the AC power generating means may also be calculated from the power level samples and integrated over an input frequency range of the AC power generating means to determine an input frequency to the AC power generating means. The change in frequency of the AC output voltage may then be determined from the input frequency and the DC input power level. Preferably, the derivative of the output power level of the AC power generating means is integrated to generate the control signal. In addition, the output frequency may be continuously integrated toward a fixed target frequency or continuously adjusted so as to phase lock with an alternate power source.

Those skilled in the art will appreciate that the techniques of the invention can be implemented using either digital signal processing software algorithms, digital and analog circuitry, or a combination of both.

BRIEF DESCRIPTION OF THE DRAWINGS

The above and other objects and advantages of the invention will become more apparent and will be more readily appreciated from the following detailed description of the presently preferred exemplary embodiments of the invention taken in conjunction with the accompanying drawings, of which.

DETAILED DESCRIPTION OF THE PRESENTLY PREFERRED EMBODIMENTS

Figure 1:
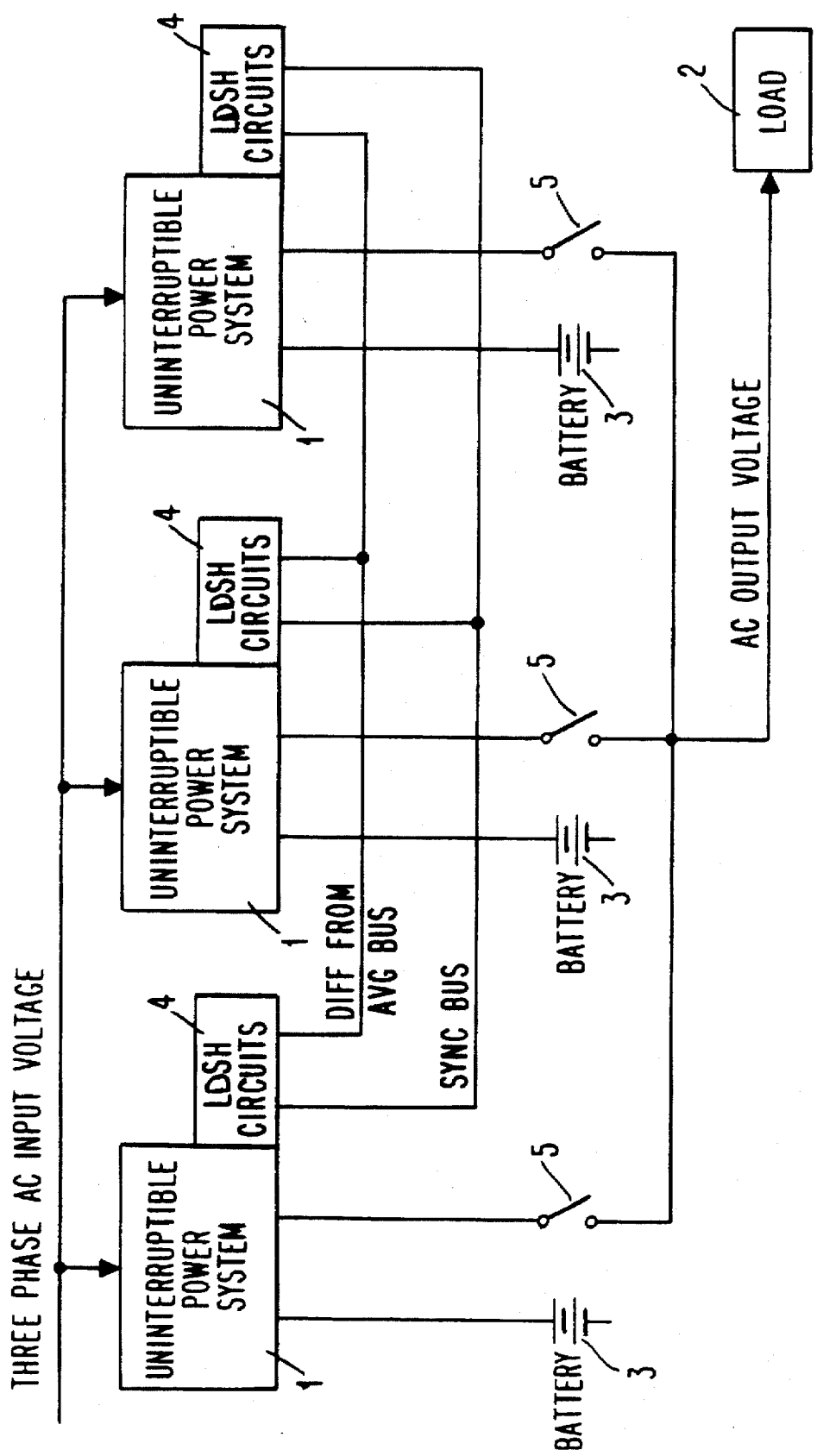
FIG. 1 illustrates a prior art parallel redundant configuration of uninterruptible power supplies in which synchronous and/or difference from average load sharing signals are communicated among the power supplies on shared busses for controlling load sharing.

The present invention will be described in detail below with respect to FIGS. 2–5. Those skilled in the art will appreciate that the description given herein is for explanatory purposes only and is not intended to limit the scope of the invention. For example, while the invention is described in connection with uninterruptible power systems (UPSs), the techniques of the invention may also be applied to other types of power systems as well. Accordingly, the scope of the invention is only to be limited by the scope of the appended claims.

The present invention is specifically designed for use with an uninterruptible power system (UPS) which is controlled by a microprocessor or microcontroller. Accordingly, the control hardware has the ability to digitize input analog signals, to perform mathematical manipulations and comparisons using the digital data, and to provide control outputs based on those manipulations and comparisons. A person skilled in the art of writing embedded code for a microcomputers or microcontrollers and familiar with digital signal processing (DSP) techniques should have no difficulty implementing the invention as described below.

In order to better understand the operating principles of the invention, the relationships among power, frequency, and output signal phase will first be described.

Due to impedance mismatches among respective power systems connected in parallel, a phase error among the output voltages of the different parallel power systems creates a real power error among the power systems. Although phase error may also result in a reactive power error, it does not affect the operation of the invention and thus will not be described. Instead, it is observed that the phase error creates a real power error and that the phase between the AC power systems is proportional to the real power error as shown in Equation (1), where $K_{13}$POWER is a constant:

POWER ERROR=PHASE ERROR * $K_{13}$POWER    Equation (1)

On the other hand, reactive power could be used in a system where a phase error between respective power systems causes a reactive power difference.

The difference between the output frequencies of two AC signals can be determined by differentiating the phase error between the two AC signals. This relationship is well documented in text books that discuss the fundamentals of phase lock loops. In other words:

FREQUENCY ERROR=d(PHASE ERROR)/dt    Equation (2)

As indicated by Equation (2), the frequency error between two AC signals can be determined from the rate of change of the phase error. The actual position of the phase is not important. Since a change in phase error will proportionally generate a change in the unit's power level (Equation (1)), the frequency error can be determined by differentiating the output power level, although the constant load level information is lost. In particular:

FREQUENCY ERROR=d(POWER LEVEL)/dt=
DELTA POWER    Equation (3)

Thus, delta power is the rate of change of the power level which represents the frequency error between the power systems. As will be explained in more detail below, delta power is used in accordance with the invention to compensate for the frequency differences between the power systems, thereby facilitating load sharing.

Since the frequency error between two power systems is related to the change in the output power level of a power system, the output power level of each power system has the necessary information for load sharing with multiple powers systems. In short, Equation (3) shows that the derivative (rate of change) of the output power level of a power system (delta power) represents the frequency error between the power systems. Moreover, the actual power level, denoted "power level," is used to bias the power system's output frequency so as to correct the phase error.

This technique can function independently although it is typically integrated into an AC power system's phase locked loop controller, which power systems generally incorporate to phase lock to an alternate power source. On the other hand, the power systems may generate a fixed output voltage frequency. "Delta Power" load sharing in accordance with the invention can be used in systems with either type of controller or systems which incorporate both types of controllers.

Figure 2:
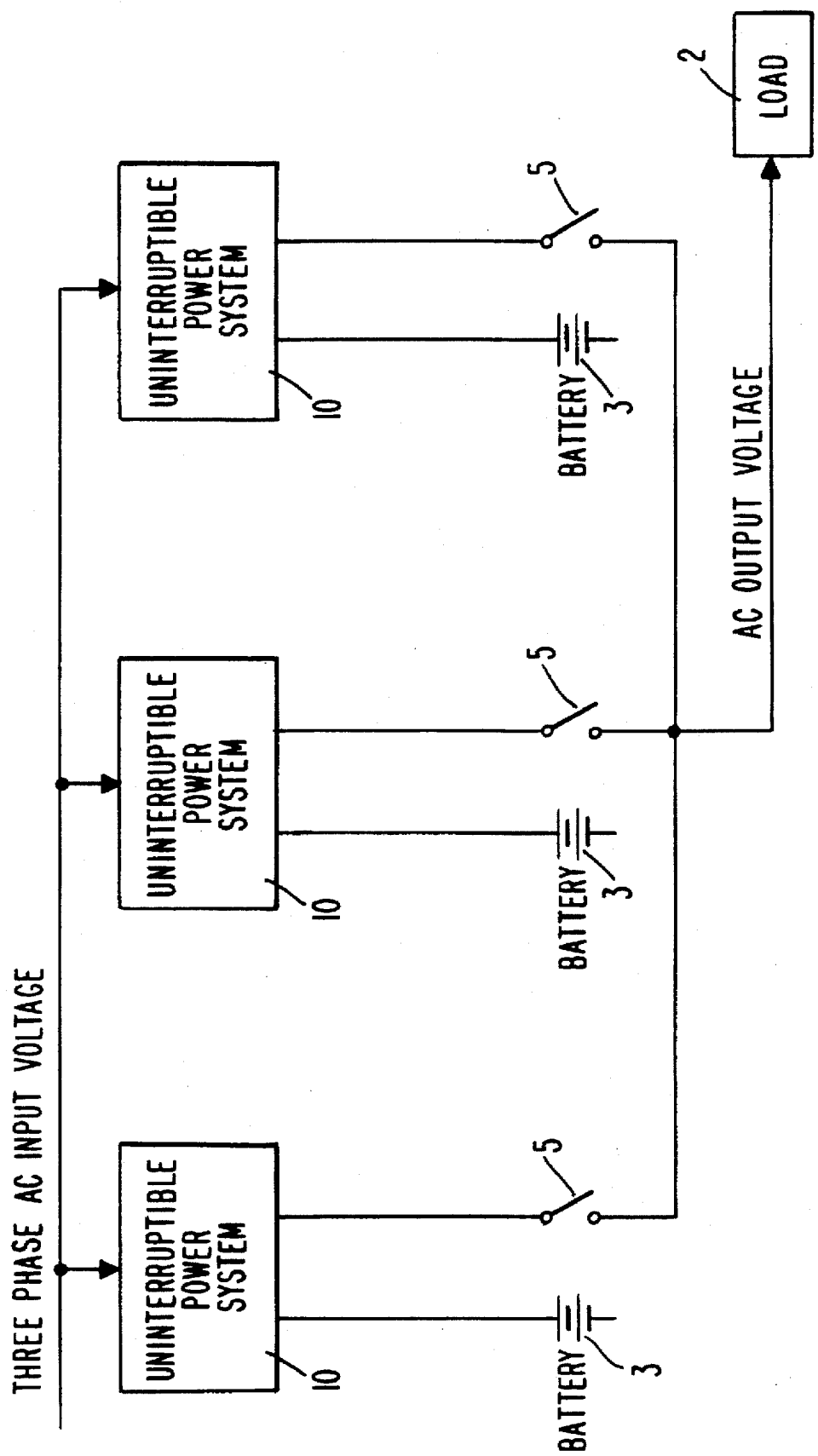
FIG. 2 illustrates a parallel redundant configuration of uninterruptible power supplies in accordance with the invention in which no inter-unit communication is necessary for load sharing.

FIG. 2 illustrates a parallel redundant configuration of uninterruptible power supplies in accordance with the invention. As illustrated in FIG. 2, no inter-unit communication is necessary for load sharing. Instead, each UPS 10 monitors its own power output and controls its own output voltage frequency using the "delta power" technique of the invention, which inherently minimizes phase differences with other parallel power systems. The "delta power" technique in accordance with the invention now will be described in more detail with respect to FIGS. 3–5.

Figure 3:
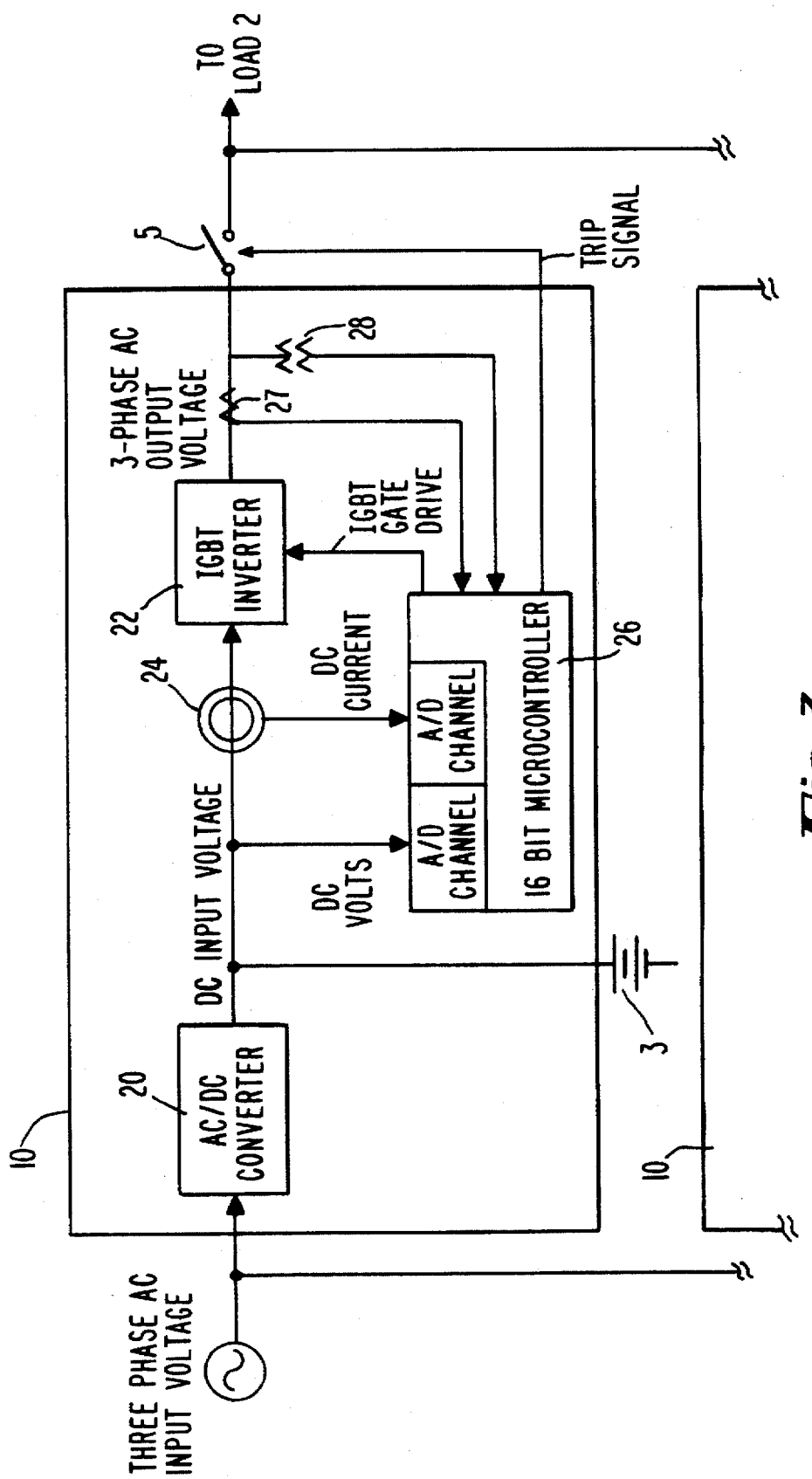
FIG. 3 illustrates a preferred embodiment of an uninterruptible power system 10 in accordance with the invention.

FIG. 3 illustrates a preferred embodiment of an uninterruptible power system 10 in accordance with the invention, whereby no inter-unit signaling is necessary for providing load sharing. As illustrated, the three phase AC input voltage is provided to an AC/DC converter 20, where it is converted to a DC input voltage. Alternatively, in the event of an AC power failure, the DC input voltage may be provided directly by battery 3. 25 As known by those skilled in the art, IGBT inverter 22 generally converts the DC input voltage into a three phase AC output voltage which is supplied to load 2 via an output power connection including a solid state or mechanical closed switch or relay 5.

The load sharing technique of the invention is implemented by providing a current transformer 24 which is connected to the input terminal of the IGBT inverter 22 so as to detect the DC input current flowing into the IGBT inverter 22. The detected DC input current and DC input voltage signals are then provided to respective A/D converter channels of a 16-bit high speed microcontroller 26 where they are sampled by microcontroller 26 and used to control the three phase output frequency of the IGBT inverter 22 so that parallel power systems share the load equally. In a preferred embodiment, microcontroller 26 digitizes the DC input current (I) and voltage (V) at a 3 kHz rate. In addition, as explained in a copending patent application assigned to the present assignee, entitled "Wireless Selective Tripping of AC Power Systems Connected in Parallel," the microcontroller 26 may also provide a trip signal to switch or relay 5 to remove the power system 1 from the power supply circuit when faulty operation is detected.

Figure 4:
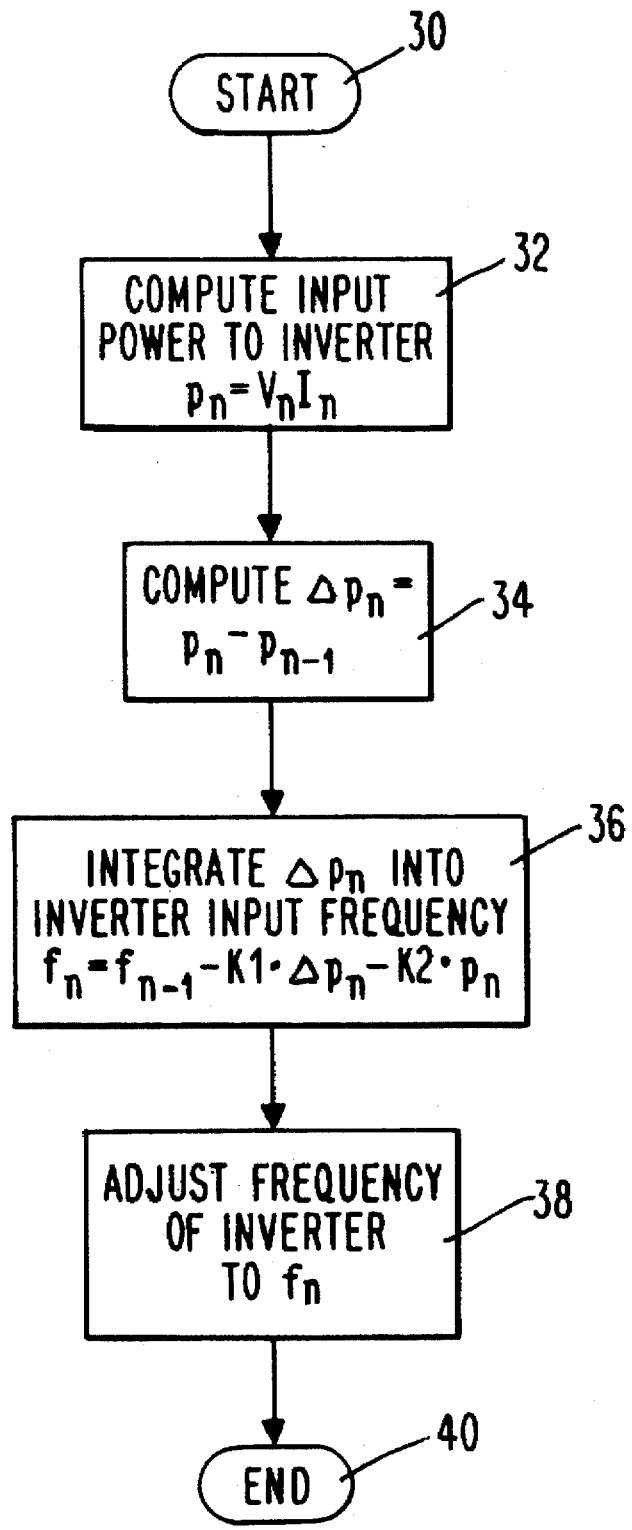
FIG. 4 illustrates a flow chart of the operation of a preferred embodiment of the microcontroller 26 of the uninterruptible power system 10 illustrated in FIG. 3.

Load sharing is controlled by microcontroller 26 in response to processing of the sampled DC input current and voltage signals. In a preferred embodiment, microcontroller 26 implements the flow chart of FIG. 4 for processing the received DC current and voltage samples and for providing the resulting IGBT gate drive signal to IGBT inverter 22 to control the output frequency of the IGBT inverter 22 in a manner that forces it to load share with other parallel power systems. Alternatively, the power level may be sampled directly using a power transducer and provided to the microcontroller 26. The flow chart of FIG. 4 would be modified accordingly. Preferably, the flow chart of FIG. 4 is implemented in firmware of microcontroller 26, although those skilled in the art will appreciate that the flow chart of FIG. 4 may be implemented in software or special purpose hardware as desired. In a preferred embodiment, the algorithm of FIG. 4 is implemented on microcontroller 26 at a 3 kHz rate.

Upon entry of the load sharing routine of FIG. 4 at step 30, the digitized DC voltage ($V_n$) and DC current ($I_n$) samples received by microcontroller 26 are multiplied together at step 32 to compute the DC input power $p_n$ to the IGBT inverter 22. In other words, $p_n = V_n * I_n$. Of course, the inverter input power level $p_n$ is proportional to the inverter output power level $P_n$ (i.e., $P_n = K2 * p_n$, where K2 is a constant gain that defines the dynamic response of the inverter 22). Then, at step 34, the change in input power level ($\Delta p_n$) is computed as $\Delta p_n = p_n - p_{n-1}$, where $p_n$ is the input power level for the current DC input samples and $p_{n-1}$ is the input power level for the previous DC input samples. Next, at step 36, the change in input power, $\Delta p_n$ is integrated over the inverter's input frequency range to yield the inverter input frequency $f_n$ as follows:

$$f_n = f_{n-1} - (K1 * \Delta p_n) - (K2 * p_n)$$    Equation (4)

where K1 and K2 are constants that define the dynamic response of the power system and $f_{n-1}$ is the inverter input frequency for the previous DC input samples. Microcontroller 26 then outputs an IGBT gate drive signal to IGBT inverter 22 at step 38 so as to drive the output power to the frequency $f_n$. The load share routine is then exited at step 40.

The rate of change of the output power is thus used to force the frequencies of the respective inverters together to a fixed frequency or a frequency of an alternate power source for the respective power systems. If the frequencies of the power systems are not the same, the power levels of the power systems will be changing. The power level itself is used to bias the inverter output frequency to correct for steady state load errors for load sharing so that no digital synchronizing signal or difference from average analog signal are needed to change the output frequency of a particular inverter.

As stated above, the output frequency of the IGBT inverter 22 is controlled to either run at a fixed frequency or to synchronize to an alternate power source. The present invention operates in conjunction with this requirement. In the preferred embodiment, the frequency is updated at a 3 kHz rate due to the input power level to the IGBT inverter 22. The frequency is also updated once per AC output voltage cycle to either run at a fixed frequency or to synchronize (e.g., phase lock) to an alternate voltage source.

To cause the power system 10 to operate at a fixed frequency, the output voltage frequency of the IGBT inverter 22 is altered one time per cycle as shown in Equation (5) below. The 3 kHz update using the input power level to the IGBT inverter 22 will compensate for any load share error caused by this change in inverter output voltage frequency.

$$f_n = f_{n-1} + K3*(\text{TARGET FREQUENCY}) - f_n \quad \text{Equation (5)}$$

where $f_n$ is the output frequency of the IGBT inverter 22 for sample n, TARGET FREQUENCY is the desired output voltage frequency, and K3 is a gain value that defines the dynamics of the power system. This once per cycle update biases the system to its TARGET FREQUENCY. The frequency update due to the input power level to the IGBT inverter 22 causes the IGBT inverter 22 to share the system load.

On the other hand, to cause the power system to synchronize to an alternate power source while maintaining load share, the output voltage frequency of the IGBT inverter 22 is altered one time per AC cycle as shown in Equations (6) and (7) below. The 3 kHz update using the input power level to the IGBT inverter 22 will compensate for any load share error caused by this change in output voltage frequency of the IGBT inverter 22.

$$f_n = f_{n-1} + K4*(\text{Alternate Source Frequency} - f_n) \quad \text{Equation (6)}$$

$$F_n = f_{n-1} + K5*(\text{Phase Error}) \quad \text{Equation (7)}$$

where the alternate source frequency is the desired output voltage frequency and K4 and K5 are gain values that define the dynamics of the synchronizing (i.e., phased lock loop) system. In this case, the actual output frequency of the IGBT inverter 22, $F_n$, is the sum of integrated frequency, $f_n$, and a portion of the phase error between the output voltage of the IGBT inverter 22 and the alternate power source voltage. The once per cycle update causes the output voltage of the IGBT inverter 22 to phase lock to the alternate power source. The frequency update due to the input power level to the IGBT inverter 22 causes the IGBT inverter 22 to share the system load in accordance with the rated voltages of the power systems.

To cause a power system to regulate a fixed output load level instead of maintaining load share, the output voltage frequency of the IGBT inverter 22 can be altered one time per cycle as shown in Equation (8) below. The 3 kHz update using the input power level to the IGBT inverter 22 will stabilize the frequency and phase operation.

$$f_n = f_{n-1} + K6*(\text{Desired Output Power Level} - \text{Actual Power Level}) \quad \text{Equation (8)}$$

where the desired output power level is the target output power level for the power system 10, the actual power level is the output power level of the IGBT inverter 22, and K6 is a gain value that defines the dynamics of the system.

As will be appreciated by those skilled in the art, the constant gain levels K1, K2, K3, K4, K5, and K6 set forth above will vary depending on the power system, control technology, power to phase error gains, and desired dynamic operation. Due to power to phase error gain, implementation techniques, sensor resolution, sensor gains, sample rates and other system requirements, a control system analysis may be required to determine these gains and to characterize the operation of the system. However, this standard type of analysis is well known by individuals skilled in control system analysis and design and will not be described herein. Such persons skilled in the art will also appreciate that the changes in output power, the frequency error, phase error, and output power level values may be limited to a predetermined range to obtain desirable system operation. However, careful analysis and simulation should be performed to determine the effects of these limits.

Figure 5:
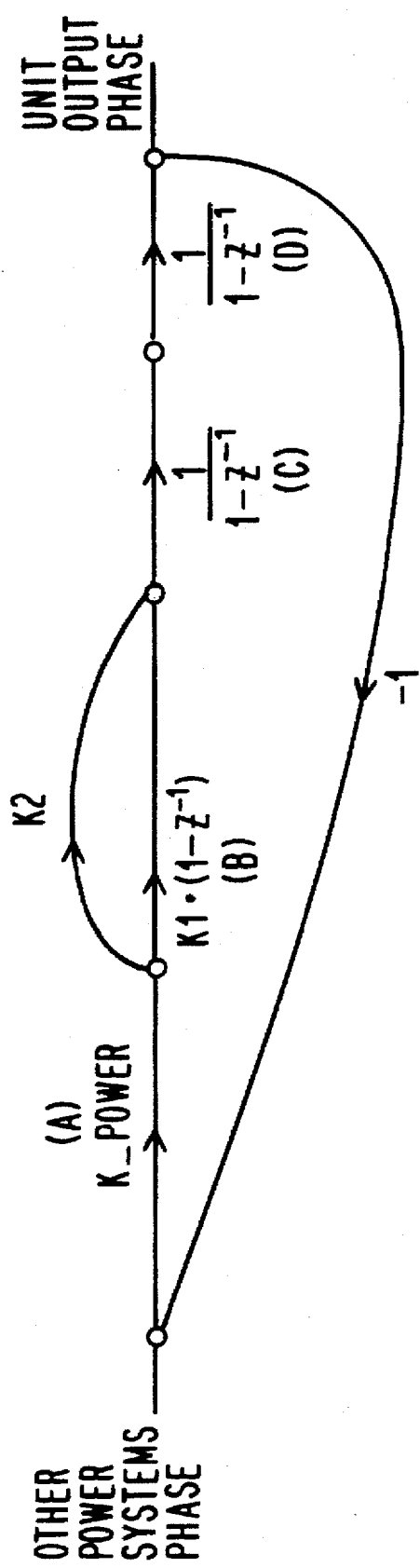
FIG. 5 illustrates a signal flow diagram illustrating the delta power load share technique of the invention.

A signal flow diagram for the delta power load share technique of the invention is shown in FIG. 5. As known by those familiar with signal flow diagrams, an arrow denotes multiplication and a "0" denotes addition. In FIG. 5, $K_{13}$POWER (A) is the gain from phase error to power difference, (B) is the derivative of the power level ("delta power"), (C) is the integration of delta power, (D) is the inherent integration of frequency to phase in a phase locked loop, and K1 is the power level gain.

Those skilled in the art will also appreciate that parallel power systems may operate in many modes and that transitions among these modes can occur at different times. Generally, there are two types of operation: free running at a fixed frequency and phase locking to a reference source. Thus, in the case of two parallel power systems, both can be free running, both can be phase locking, or one free running and one phase locking. The "delta power" load sharing technique described herein applies to all of these modes. Of course, as more power systems and types of operation become available, many more modes of operation are also possible.

As described above, the present invention is based on the concept that the derivative of the output power level of a power system may be integrated to compensate for frequency differences between parallel power systems. The power level itself is used as a bias in a manner that compensates for a fixed phase errors that may exist between two frequency locked systems. The "delta power" technique described herein is a control technique that allows independent power systems to operate in parallel and load share without any interconnecting requirements. It compensates for errors between the systems and allows parallel operation while operating in the free run mode, the phase lock mode, and while switching between these modes or operating power systems in different modes.

Since the "delta power" load sharing technique of the invention allows a power system to simply monitor its own output power level to provide load sharing control, multiple power systems may be connected in parallel without the addition of load share circuitry or control wiring between respective power systems. The derivative of a power system's output power level is used to frequency lock the power systems, while the output power level itself is used to correct for phase error between the units. The requirements and problems associated with parallel AC power systems of the prior art are thereby solved without any additional circuitry or wiring requirements.

Those skilled in the art will appreciate that the wireless load sharing techniques described herein when used in connection with a wireless selective tripping technique of the type described in a related application entitled "Wireless Selective Tripping of AC Power Systems Connected in Parallel" filed by the same assignee on even date herewith enables a new class of applications where there is a need to parallel the output of AC power sources. Such applications may include: automatic reconfiguration of a power source array, self attachment of power sources in a solar farm, or automatic "Hot Tie" for low cost, low power UPSs.

Although exemplary embodiments of the invention have been described in detail above, those skilled in the art will readily appreciate that many additional modifications are possible in the exemplary embodiments without materially departing from the novel teachings and advantages of the invention. For example, the present invention is advantageously used in combination with the afore-mentioned wireless selective tripping application whereby the functions of the respective microcontrollers may be combined into a single microcontroller. In addition, the present invention also may be used in conjunction with conventional load sharing techniques as desired. In addition, those skilled in the art will appreciate that the AC output power may be sampled using, e.g., a current transformer 27 and a voltage transformer 28 and processed instead of the DC input power in accordance with the invention. Also, the power may be sampled directly using currently available power transducers (as opposed to sampling the voltage and current as shown in FIG. 3). Accordingly, all such modifications are intended to be included within the scope of the invention as defined in the following claims.

We claim:

1. A parallel redundant power system comprising at least two power systems connected in parallel so as to provide AC power to a load via a common power connection, at least one of said power systems comprising:

means for generating an AC output voltage from a DC input power source;

means for sampling one of a DC input voltage from the DC input power source and said AC output voltage from said AC output voltage generating means to provide power level samples;

means for determining the AC output power of said AC output voltage generating means from the power level samples; and means for providing a control signal to said AC output voltage generating means to control the AC output phase and output frequency of said AC output voltage from said AC output voltage generating means based on the output power level of the AC output voltage generating means and a derivative of the output power level of the AC output voltage generating means so as to affect load sharing in a manner proportional to a unit power rating of said power system with other power systems to which the power system is connected in parallel without requiring inter-unit signaling between the power systems.

2. A power system as in claim 1, wherein said AC output voltage generating means generates a three phase output power.

3. A power system as in claim 1, wherein said AC output voltage generating means generates one of single phase and split phase output power.

4. A power system as in claim 1, wherein said sampling means comprises means for sampling DC current and DC voltage of said DC input power source and means for multiplying said DC voltage and said DC current samples to obtain said power level samples.

5. A power system as in claim 1, wherein said sampling means comprises means for sampling AC current and AC voltage of said AC output voltage generating means and means for multiplying said AC voltage and said AC current samples to obtain said power level samples.

6. A power system as in claim 1, wherein said control signal drives said AC output voltage generating means to load share in a proportion defined by said unit power rating of said AC output voltage generating means divided by a total combined rating of said power systems.

7. A power system as in claim 1, wherein said control signal drives said AC output voltage generating means to provide a fixed amount of output power.

8. A power system as in claim 1, wherein said providing means calculates a change in DC input power level to said AC output voltage generating means from said power level samples and integrates said change in DC input power level over an input frequency range of said AC output voltage generating means to determine an input frequency to said AC output voltage generating means.

9. A power system as in claim 8, wherein said providing means calculates said change in frequency of said AC output voltage from said input frequency and said DC input power level.

10. A power system as in claim 1, wherein said providing means integrates said derivative of said output power level of said AC output voltage generating means to generate said control signal.

11. A power system as in claim 1, wherein said providing means comprises means for continuously integrating said output frequency of said AC output voltage toward a fixed target frequency.

12. A power system as in claim 1, wherein said providing means comprises means for continuously adjusting said output frequency of said AC output voltage to phase lock with an alternate power source.

13. A power system as in claim 1, wherein said control signal drives said AC output voltage generating means to stabilize said output frequency and said AC output phase of said AC output voltage.

14. A method of providing independent load sharing amongst at least two power systems connected in parallel so as to provide AC power from an AC power generating means of each power system to a load via a common power connection, comprising the steps of:

generating an AC output voltage from a DC input power source;

sampling one of a DC input voltage from the DC input power source and said AC output voltage from said AC power generating means to provide power level samples;

determining the AC output power of said AC power generating means from the power level samples; and providing a control signal to said AC power generating means to control the AC output phase and output frequency of said AC output voltage from said AC power generating means based on the output power level of the AC power generating means and a derivative of the output power level of the AC power generating means so as to affect load sharing in a manner proportional to a unit power rating of said power system with other power systems to which the power system is connected in parallel without requiring inter-unit signaling between the power systems.

15. A method as in claim 14, wherein said sampling step comprises the steps of sampling DC current and DC voltage of said DC input power source and multiplying said DC voltage and said DC current samples to obtain said power level samples.

16. A method as in claim 14, wherein said sampling step comprises the steps of sampling AC current and AC voltage of said AC power generating means and multiplying said AC voltage and said AC current samples to obtain said power level samples.

17. A method as in claim 14, comprising the additional step of driving said AC power generating means to load share in a proportion defined by said unit power rating of said AC power generating means divided by a total combined rating of said power systems.

18. A method as in claim 14, comprising the additional step of driving said AC power generating means to provide a fixed amount of output power.

19. A method as in claim 14, wherein said providing step comprises the steps of calculating a change in DC input power level to said AC power generating means from said power level samples and integrating said change in DC input power level over an input frequency range of said AC power generating means to determine an input frequency to said AC power generating means.

20. A method as in claim 19, wherein said providing step comprises the step of calculating said change in frequency of said AC output voltage from said input frequency and said DC input power level.

21. A method as in claim 14, wherein said providing step comprises the step of integrating said derivative of said output power level of said AC power generating means to generate said control signal.

22. A method as in claim 14, comprising the additional step of continuously integrating said output frequency of said AC output voltage toward a fixed target frequency.

23. A method as in claim 14, comprising the additional step of continuously adjusting said output frequency of said AC output voltage to phase lock with an alternate power source.

24. A method as in claim 14, comprising the additional step of driving said AC power generating means to stabilize said output frequency and said AC output phase of said AC output voltage.

25. A method of providing independent load sharing amongst at least two DC to AC inverters connected in parallel so as to provide AC power from a DC to AC inverter of each power system to a load via a common power connection, comprising the steps of:

generating an AC output voltage from a DC input power source;

sampling one of a DC input voltage from the DC input power source and said AC output voltage from said DC to AC inverter to provide power level samples;

determining a derivative of an input power level to said DC to AC inverter to generate a control signal and from said power level samples and providing said control signal to said DC to AC inverter so as to stabilize a load share operation with other DC to AC inverters to which said DC to AC inverter is connected in parallel; and using a DC input power level to said DC to AC inverter to control an AC output voltage phase angle so that the AC output voltage phase is synchronized to said other DC to AC inverters to which said DC to AC inverter is connected in parallel, while simultaneously adjusting said AC output voltage frequency toward one of a fixed frequency and a frequency of an alternate power source.

* * * * *